Dec. 9, 1924. 1,518,619
A. F. WELCH
SYSTEM OF MOTOR CONTROL
Filed March 31, 1922
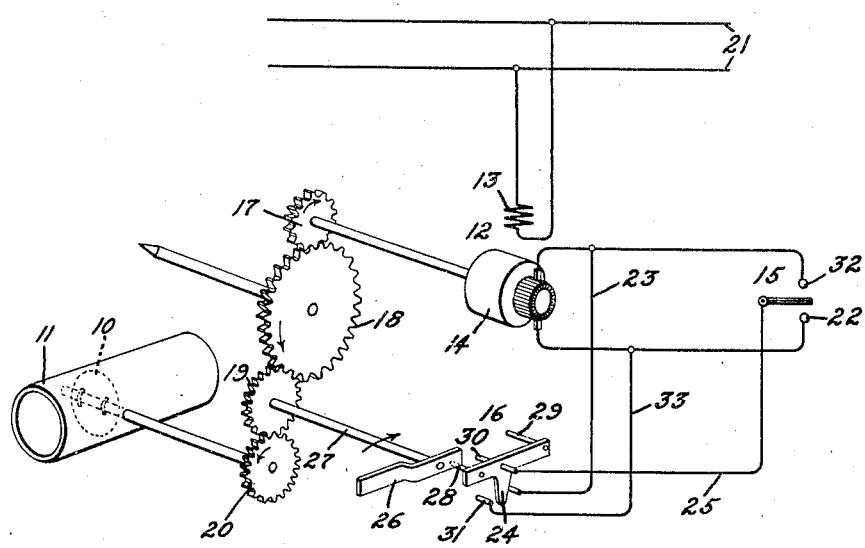
Inventor:
Alfred F. Welch,
by Albert S. Davis
His Attorney.

Patented Dec. 9, 1924.

1,518,619

UNITED STATES PATENT OFFICE.

ALFRED F. WELCH, OF FORT WAYNE, INDIANA, ASSIGNOR TO GENERAL ELECTRIC COMPANY, A CORPORATION OF NEW YORK.

SYSTEM OF MOTOR CONTROL.

Application filed March 31, 1922. Serial No. 548,542.

*To all whom it may concern:*

Be it known that I, ALFRED F. WELCH, a citizen of the United States, residing at Fort Wayne, in the county of Allen, State of Indiana, have invented certain new and useful Improvements in Systems of Motor Control, of which the following is a specification.

My invention relates to motor operated devices and the control of the same for controlling the operation of furnace dampers, valves and the like in response to a predetermined selected condition, such for instance as in response to temperature changes, pressure changes, or the like.

The invention is particularly applicable to the control and operation of the damper of a furnace in response to the heat supplied, although the invention is not necessarily limited to such use.

It is particularly desirable to be able to operate and control a motor for operating a furnace damper, for example, from a lighting circuit, because that is ordinarily available. The customary lighting circuit is 110 volts alternating current, and the fire underwriters have determined that to be a safe voltage for operating the motor, but unsafe for controlling the motor. Damper regulating motors are frequently controlled by means of a thermostat located in any suitable place, and the underwriters have determined that it is unsafe to control a 110 volt circuit by means of a thermostat.

One of the objects of my invention is to provide an improved arrangement whereby the damper operating motor may be operated and safely controlled entirely by power supplied from a comparatively high voltage supply circuit, such for instance as the customary 110 volt alternating current lighting circuit.

In carrying my invention into effect, I provide a system of control having an alternating current operating motor which is designed so as to not only act as a motor but also act as a transformer to give a reduced voltage circuit on which the switch mechanism for controlling the motor may safely operate.

For a better understanding of the invention, reference is had to the accompanying drawing which illustrates an embodiment of the invention in the control of a furnace damper in response to temperature changes for the purpose of explaining the principles of the invention.

Referring to the drawing, the device to be automatically controlled is illustrated as a damper 10 in the furnace flue 11. This damper is operated toward and from the separately operable starting switch or closed position by means of the alternating current motor 12, which is preferably of the single phase repulsion type, having a stator winding 13 and a rotor 14 having a suitable winding, commutator and commutator brushes. This motor is arranged to be automatically controlled by means of the thermostat 15 which is arranged to be connected in the rotor or armature circuit of the motor, and also by means of a suitable limit switch such as the two-position switch 16 which is arranged to be operated between its predetermined limits to stop the motor in accordance with the operation of the damper 10. The limit switch 16 need not be of the particular form shown, but this type of switch will serve to explain the principles of the invention. The stator or armature of the motor is connected to the damper 10 through the pinion 17, the idler gear 18, the idler pinion 19 and the gear 20.

The field or stator 13 of the motor is designed so that it may be connected directly to the alternating current source of supply 21, which may be a convenient lighting circuit or other comparatively high voltage source of supply. The motor is designed so that a comparatively low voltage will be induced in the rotor or armature circuit of the motor. The fire underwriters have determined that 12 volts is a suitable safe voltage which can be safely handled by thermostatic or other automatically operated devices for controlling the operation of the damper motor. The motor 12 therefore not only operates as a motor to turn the damper 10, but it also serves as a transformer to supply the comparatively low potential circuit for controlling the motor.

The operation of my invention as thus constructed and arranged and with the parts in their respective positions shown in the drawing, is as follows: The damper 10 is shown in the closed position,—and let it be assumed that the temperature in the room or other space which is to be supplied with heat from the furnace (not shown) is such that the thermostat 15 will make engagement with the contact 22 at one of the limits of operation of the thermostat (the lower temperature limit). The stator 13 is permanently connected to the comparatively high potential source of supply 21, so that when the thermostat makes engagement with the contact 22, the rotor of the motor is closed upon itself through a circuit including the conductor 23, the switch member 24 of the switch 16 which is automatically operated in response to the extent of operation of the damper, the conductor 25, thermostat 15 and contact 22. The armature or rotor of the motor is thereby closed upon itself and the motor will operate in the direction indicated by the arrow, thereby rotating the speed-changing pinions and gears in the directions indicated by the arrows on the respective parts. The right hand or shorter end of the arm 26 secured to the shaft 27 will be moved out of engagement with the resilient pin 28, and when the motor has operated through a predetermined travel, the long end of the arm 26 will engage the resilient pin 29 and thereby tilt the switch member 24 about its pivot 30 into engagement with the contact 31, thereby automatically opening the rotor circuit of the motor. The arrangement will be such that the switch 16 will automatically and periodically open the rotor circuit of the motor when the damper is either in the closed or full open position, although any other desired operation may be had as determined upon. The resiliency of the pins 28 and 29 in the arrangement shown permits the switch members 26 and 24 to spring by each other and thus effect the intended operation of the limit switch. When the switch member 24 makes engagement with the contact 31, the armature circuit of the motor is partially completed at the switch 16, but the armature circuit will not be completed until the temperature of the room or other space being heated is such that the thermostat 15 will make engagement with the contact 32 at the upper temperature limit of the thermostat. When this happens, the stator of the motor is short circuited through a circuit including the conductor 33, contact 31, switch member 24, conductor 25, thermostat 15, and contact 32. The motor will now operate in the same direction as before and will rotate the damper 10 until the damper is in the closed position as shown in the drawing. When the motor starts rotating, the long arm of the rotating member 26 will move out of engagement with the pin 29, and finally the short end of this arm will be brought into engagement with the pin 28, thereby moving the switch member 24 out of engagement with the contact 31 and into engagement with the opposite contact of the other limit of the operation of the switch. The parts, with the exception of the thermostat, will now be in their respective positions shown in the drawing, so that when the thermostat 15 is caused to deflect into engagement with the contact 22, the motor will be again energized to operate for an interval until the damper 10 is in the full open position.

My invention has obvious advantages of simplicity of construction and arrangement. The motor may be directly connected to a comparatively high voltage supply circuit, such for example as the house lighting circuit. No separate low potential source of power is necessary as a low potential controlling circuit, because of the fact that the motor not only operates the damper but it also functions as a transformer for supplying the low potential controlling circuit.

In accordance with the provisions of the patent statutes, I have described the principle of operation of my invention, together with the apparatus which I now consider to represent the best embodiment thereof, but I desire to have it understood that the invention may be carried out by other means.

What I claim as new and desire to secure by Letters Patent of the United States, is:

1. A system of motor control comprising an alternating current motor having field and armature elements, one of said elements permanently connected to an alternating current supply circuit to induce a voltage in the other element of a different value than the voltage of the supply circuit, a limit switch operated by the motor for stopping the motor at a limit of operation, a separately operable switch for controlling the starting of the motor, and connections whereby closing the said separately operable switch connects the said other element of the motor in a local circuit including the said switches to effect operation of the motor and the resulting operation of said limit switch opens the local circuit in which the said other element is connected to stop the motor after a predetermined interval of operation.

2. A system of motor control comprising an alternating current motor having field and armature elements, one of said elements permanently connected to an alternating current supply circuit to induce a voltage in the other element of a different value than the voltage of the supply circuit, a limit switch operated by the motor between two limits for stopping the motor, a separately operable switch operable between two circuit closing positions for controlling the starting of the motor, and connections whereby operating the said separately operable switch to one of its limits with the said limit switch at one of its limits, connects the other element of the motor in a local circuit including the said switches to effect operation of the motor, and the resulting operation of the said limit switch to its other limit opens the local circuit in which the said other element is connected to stop the motor after a predetermined interval of operation, the connections being such that subsequent operation of the separately operable switch to its other limit of operation connects the said other element of the motor in a local circuit including the said switches to again effect operation of the motor for another interval.

3. A system of motor control comprising an alternating current repulsion motor having a field winding connected to an alternating current supply circuit, an armature for the motor within which a potential of a lower value than the potential of the said supply circuit is induced by the said field winding, an automatic switch in the motor armature circuit automatically operated between two circuit closing positions for connecting the motor armature in a local circuit to control the starting of said motor, and a limit switch automatically operated by the motor between two definite positions and interposed in the motor armature circuit between the first switch and the motor armature for interrupting the local circuit in which the motor armature is connected to stop the motor when moved from either definite position to the other.

4. A regulator comprising an alternating current repulsion motor having its field permanently connected to an alternating current supply circuit and designed to induce a potential of a lower value than the potential of the supply circuit in the motor armature, a thermostat included in the motor armature circuit for short-circuiting the motor armature to effect operation of the motor, and a limit switch included in the motor armature circuit operated by the motor for automatically opening the motor armature circuit after a predetermined interval of operation.

5. A regulator comprising an alternating current repulsion motor having its stator permanently connected to an alternating current supply circuit and designed to induce a potential of a lower value than the potential of the supply circuit in the rotor of the motor, a device connected to be operated by the said rotor, a thermostat operable between predetermined limits and connected in the rotor circuit of the motor to short-circuit the rotor at its limits, and a switch automatically operated between predetermined limits by the motor in response to the operation of the device for opening at one of its limits the short circuit of the rotor initially established by said thermostat at one limit of operation of the thermostat and partially completing a short-circuit of the rotor at another limit of operation of the switch so that the short circuit of the rotor is again initially completed by the thermostat at another limit of the thermostat.

In witness whereof, I have hereunto set my hand this 21st day of March, 1922.

ALFRED F. WELCH.